Figure 1:
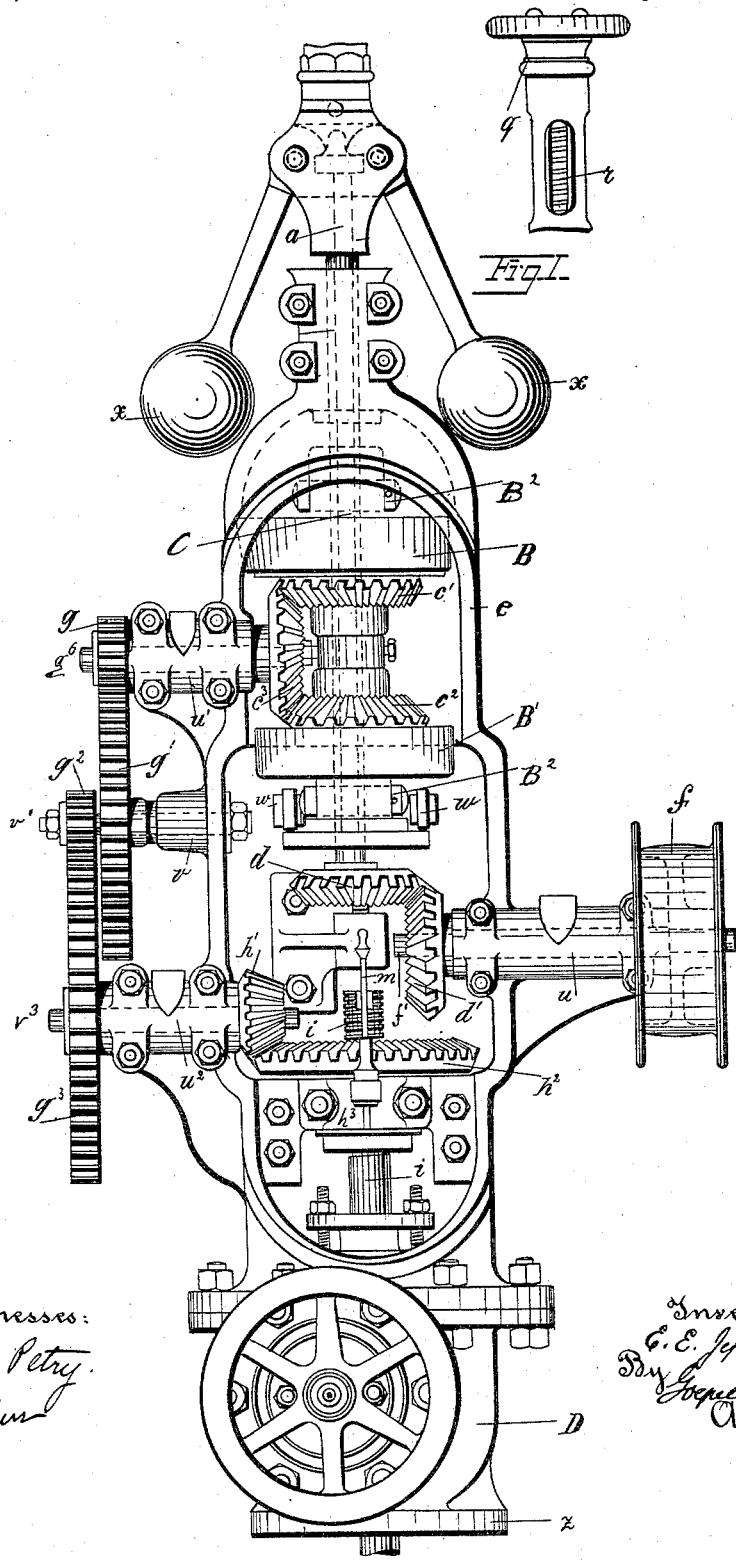

(No Model.) 4 Sheets—Sheet 1.

E. E. JEPSEN.
SPEED GOVERNOR.

No. 456,893. Patented July 28, 1891.

Witnesses:
Martin Petry.
[signature]

Inventor
E. E. Jepsen
By [signature]
Attorneys (No Model.) 4 Sheets—Sheet 2.
E. E. JEPSEN.
SPEED GOVERNOR.
No. 456,893. Patented July 28, 1891.
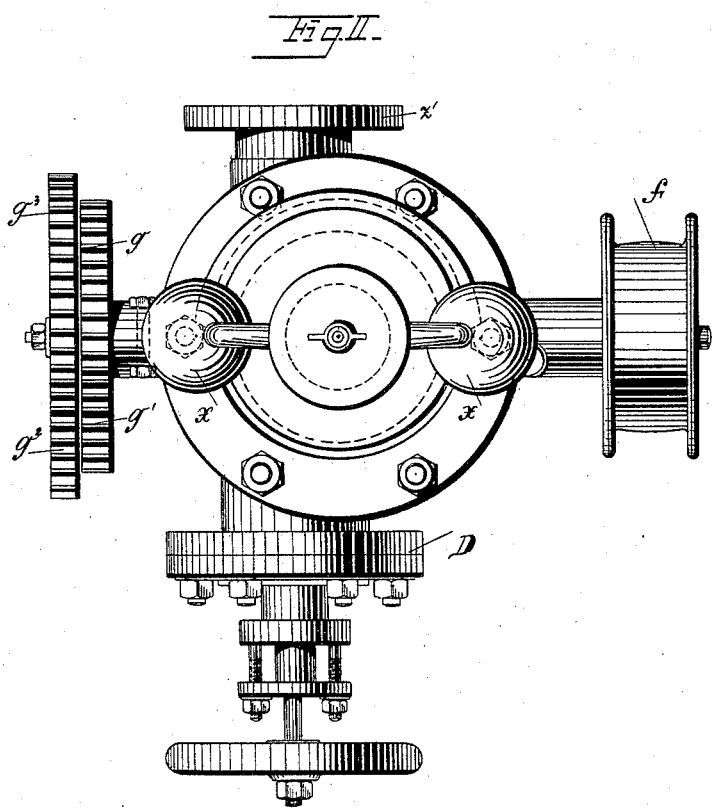

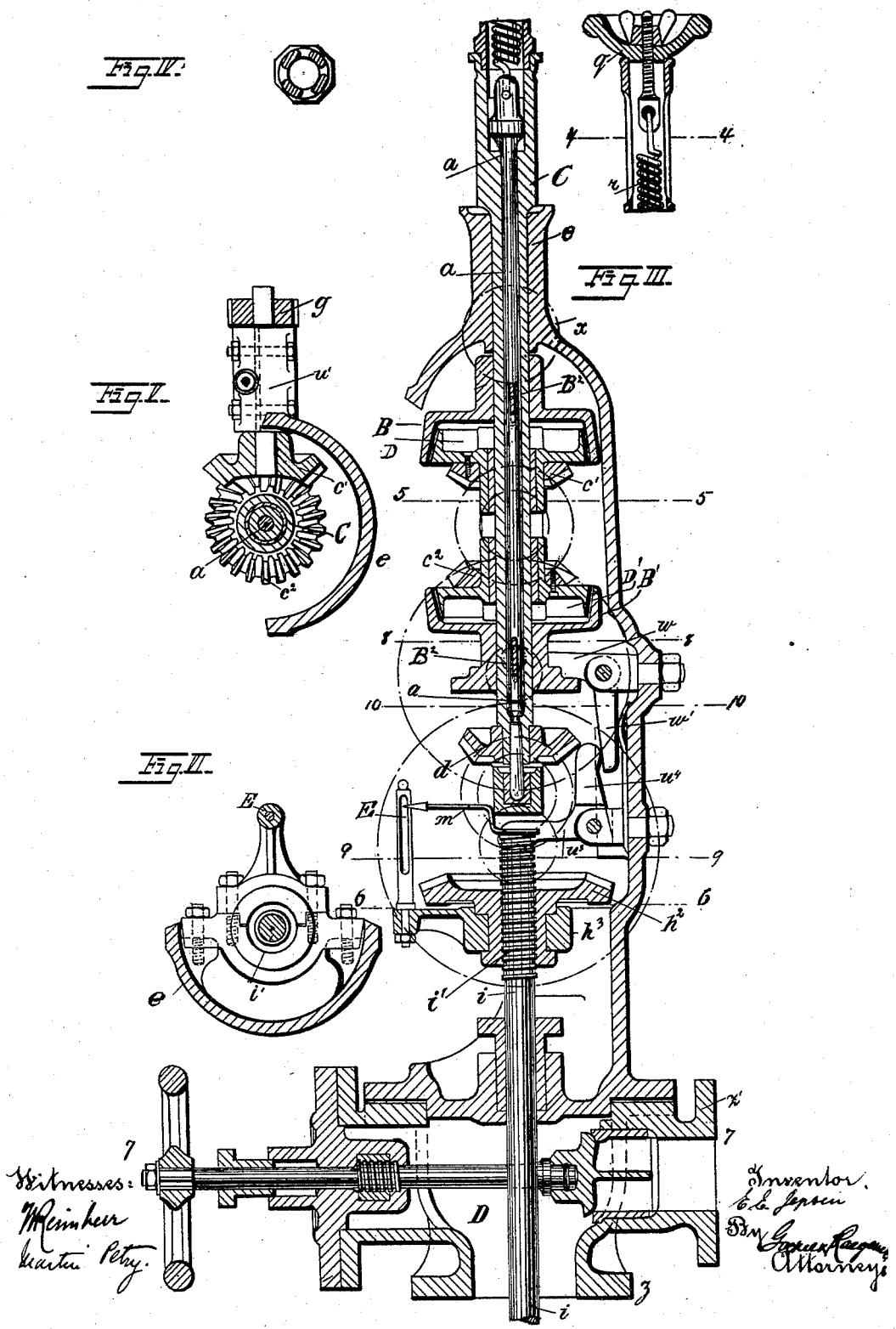

(No Model.) 4 Sheets—Sheet 4.
E. E. JEPSEN.
SPEED GOVERNOR.
No. 456,893. Patented July 28, 1891.
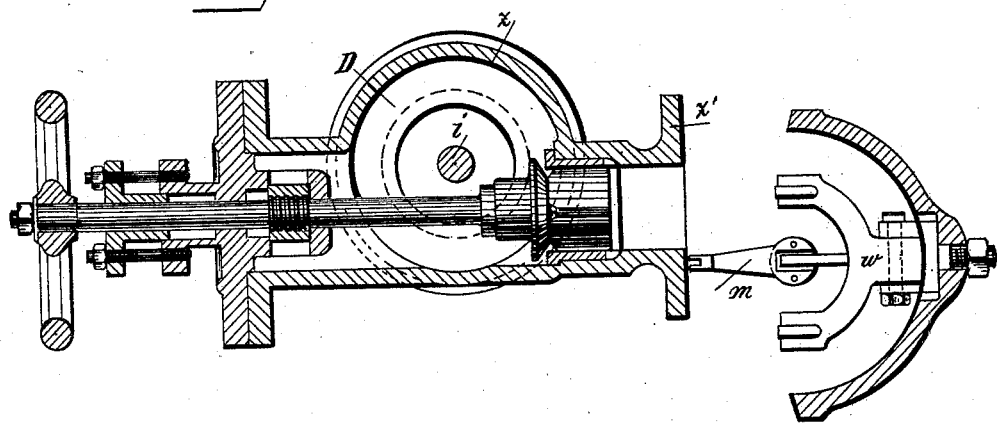
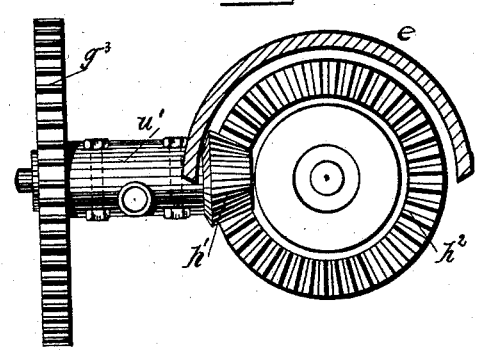
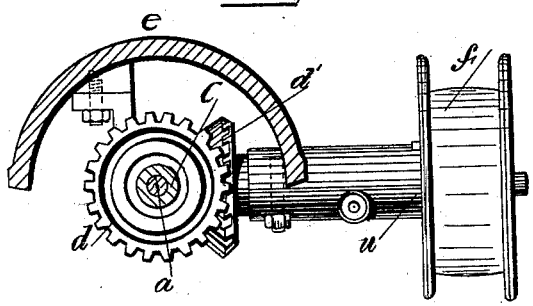

ELISABETH ESTHER JEPSEN, OF FLENSBURG, GERMANY.

SPEED-GOVERNOR.

SPECIFICATION forming part of Letters Patent No. 456,893, dated July 28, 1891.

Application filed December 11, 1890. Serial No. 374,397. (No model.)

*To all whom it may concern:*

Be it known that I, ELISABETH ESTHER JEPSEN, a citizen of Germany, and a resident of Flensburg, have invented certain new and useful Improvements in Steam-Engine Governors, of which the following is a specification.

This invention relates to improvements in governors for steam-engines; and the object of my invention is to provide a governor adapted for slide-valves with automatical variable expansion, but which can also be used for any other construction of valve.

The invention consists in the combination, with a suitable frame, of a spindle adapted to slide in a rotating hollow stem, a centrifugal device for pressing the spindle downward when the speed of the engine increases, a spring for drawing the spindle upward when the speed of the engine decreases, friction coupling-sleeves operated from said spindle and rotating with the same, friction coupling-disks adapted to be engaged by said sleeves, gearing adapted to be rotated in one direction or the other from said friction coupling devices, a cog-wheel engaging said gearing and having a screw-threaded aperture, and a valve-spindle having a screw-threaded part which is screwed through the aperture in the above-mentioned cog-wheel, whereby when the speed of the engine increases said cog-wheel is rotated in such a manner as to move the valve-spindle downward, whereas when the speed of the engine decreases the rotation of the cog-wheel is reversed and the spindle is raised to open the valve to a greater extent.

In the accompanying drawings, Figure I is an elevation of my improved steam-engine governor. Fig. II is a plan view of the same. Fig. III is a vertical longitudinal sectional view of the same. Fig. IV is a horizontal sectional view on the line 4 4, Fig. III. Fig. V is a horizontal sectional view on the line 5 5, Fig. III. Fig. VI is a horizontal sectional view on the line 6 6, Fig. III. Fig. VII is a horizontal sectional view on the line 7 7, Fig. III. Fig. VIII is a horizontal sectional view on the line 8 8, Fig. III. Fig. IX is a horizontal sectional view on the line 9 9, Fig. III. Fig. X is a horizontal sectional view on the line 10 10, Fig. III.

Similar letters of reference indicate corresponding parts.

In the drawings, the governor is shown mounted on the casing D of the main steam-valve. The flange $z$ of the main steam-valve is to be connected with the steam-chest. The main steam-pipe is to be connected with the flange $z'$ of the casing D. The stem or spindle $i$ of the regulating-valve passes through the casing D of the main valve and acts on any suitable kind of regulating-valve to open or close the same, more or less. The spindle $a$ is mounted to slide in the hollow stem C, which in turn is mounted to rotate in the governor-casing $e$. The spindle $a$ is pulled upward by a spiral spring $r$, secured to a screw $r'$, passing through a cup $g$, in which the screw is held by a thumb-nut to permit adjusting the tension of the spring. The governor-balls $x$ are secured to pivoted levers, the inner cam ends of which act on an offset of the spindle $a$ in the usual manner. The shaft $f'$ is suitably mounted in a sleeve $u$ of the casing $e$, carrying a pulley $f$ for the driving-belt, which is driven from the engine, and on the inner end of said shaft $f$ is mounted a beveled cog-wheel $d'$, engaging the beveled cog-wheel $d$, fixed on the rotating stem C. On said hollow stem C the two friction coupling-sockets B B' are mounted to slide and are held by transverse keys $B^2$ with the spindle $a$. They are adapted to receive friction coupling-disks D and D', mounted loosely on the hollow stem C. The friction coupling-disk D is provided on its under side with a bevel cog-wheel $c'$, and the friction coupling-disk D' is provided on its upper side with the bevel cog-wheel $c^2$, which bevel cog-wheels $c'$ and $c^2$ are adapted to engage the bevel cog-wheel $c^3$, fixed on one end of a shaft $g^6$, mounted in the bearing $u'$ of the governor-frame $e$ and carrying on its outer end the pinion $g$, engaging a cog-wheel $g'$ on the shaft $v'$, mounted in a bearing $v$ of the governor-frame, which shaft $v'$ is provided with a pinion $g^2$, engaging a cog-wheel $g^3$ on the shaft $v^2$, mounted in a bearing $u^2$ of the governor-frame, and on the inner end of the shaft $v^2$ is mounted the bevel-pinion $h'$, engaging the bevel cog-wheel $h^2$. Said bevel cog-wheel $h^2$ is mounted to turn in a suitable bearing $h^3$ of the governor-frame and is provided with a central screw-threaded aperture, through which the upper screw-threaded end $i'$ of the spindle $i$ is screwed. The upper end of the spindle $i$ bears on one arm $u^3$ of an elbow-lever, the other end $u^4$ of which lever bears against one end $w'$ of an elbow-lever, the opposite arm $w$ of which is forked and rests on a flange of the coupling-socket B'. A pointer $m$ is fixed on the upper end of the spindle $i$ and indicates the position of the spindle, and consequently the position of the valve on an indicator E.

The operation is as follows: When the engine is running at normal speed, both friction coupling-sockets B and B' are disengaged from the friction coupling-disks D D', and thus the cog-wheels $c'$ $c^2$ $c^3$ are not rotated, for the reason that the friction-disks D and D' with their collars are mounted loosely on the tubular casing C and are not connected with the sliding spindle $a$. If the speed of the engine increases, the governor-balls $x$ are thrown outward by centrifugal force, and the rod $a$ is thereby moved downward, the spring $r$ being extended. As the rod $a$ is moved downward the friction coupling-sockets B B' are moved downward and the upper friction coupling-socket B' is brought in contact with the upper friction-disk D, whereby said friction-disk D is rotated with the friction coupling-socket B, as is also the wheel $c'$, whereby the wheel $c^3$ is rotated, and by the cog-wheels $g, g', g^2, g^3$, and $h'$ the bevel cog-wheel $h^2$ is rotated in such a manner as to screw the spindle $i$ downward, whereby the regulating-valve is closed more or less and the speed reduced. If, on the contrary, the engine runs too slowly, the balls $x$ swing toward each other and permit the spring $r$ to pull the rod $a$ upward, whereby both friction-sockets B B' are moved upward and the lower friction-socket B' is engaged with the friction-disk D', with which the cog-wheel $c^2$ is connected, whereby by means of the above-mentioned cog-wheels the bevel cog-wheel $h^2$ is rotated in such a manner as to move the spindle $i$ upward, whereby the valve is opened and more steam admitted. It might occur that the steam-pressure in the boiler is too low or that too much work is required of the engine, thus preventing obtaining the desired high speed even when the valve is fully open. In such a case the mechanism described continues to rotate the wheel $h^2$ in such a manner as to screw the spindle $i$ upward even after the valve is fully opened. This would cause a binding and breaking of parts. To prevent this the elbow-levers $u^3$ $u^4$ $w'$ $w$ have been provided to act in the following manner: When the spindle $i$ has been moved up as far as possible, its upper end strikes the arm $u^3$, causing the other arm $u^4$ of the elbow-lever to act on the arm $w'$ of the second elbow-lever, whereby the forked arm $w$ of said second elbow-lever is moved downward, and, acting on the bottom flange of the lower friction-socket B', forces the same downward, thus preventing the lower friction-disk D' from being rotated by the lower friction-socket B'.

Having thus described my invention, I claim as new and desire to secure by Letters Patent—

1. In a steam-engine governor, the combination, with a sliding spindle, a centrifugal device for pressing same downward, a spring for drawing it upward, two opposite friction-sockets mounted to move upward and downward with the spindle, friction-disks adapted to be engaged by said sockets, cog-wheels on the friction-disks, gearing adapted to be engaged with said cog-wheels and to be rotated in one direction or the other, a cog-wheel engaged with said gearing and having a screw-threaded aperture, a valve-spindle having a screw-threaded end passed through the screw-threaded aperture in said cog-wheel, and means operated from the valve-spindle and adapted to act on one of the friction-sockets, substantially as set forth.

2. In a governor, the combination, with a sliding spindle, a centrifugal device for pressing the same downward, a spring for drawing it upward, two opposite friction-sockets mounted to move up and down with the spindle, friction-disks adapted to be engaged by said sockets, cog-wheels on the two friction-disks, gearing adapted to be engaged with said cog-wheels and to be rotated in one direction or the other, a cog-wheel engaged with said gearing and having a screw-threaded aperture, a valve-spindle having a screw-threaded end passed through the screw-threaded aperture in said cog-wheel, a forked elbow-lever adapted to act on one of the friction-sockets, and an additional elbow-lever adapted to act on the forked elbow-lever and in turn upon the upper end of the valve-spindle, substantially as set forth.

In witness whereof I have hereunto set my hand in presence of two witnesses.

ELISABETH ESTHER JEPSEN.

Witnesses:
L. BÖTTCHER,
F. MULLER.